May 25, 1948.    F. J. PRIBIL    2,442,326
BEATER
Filed June 11, 1946
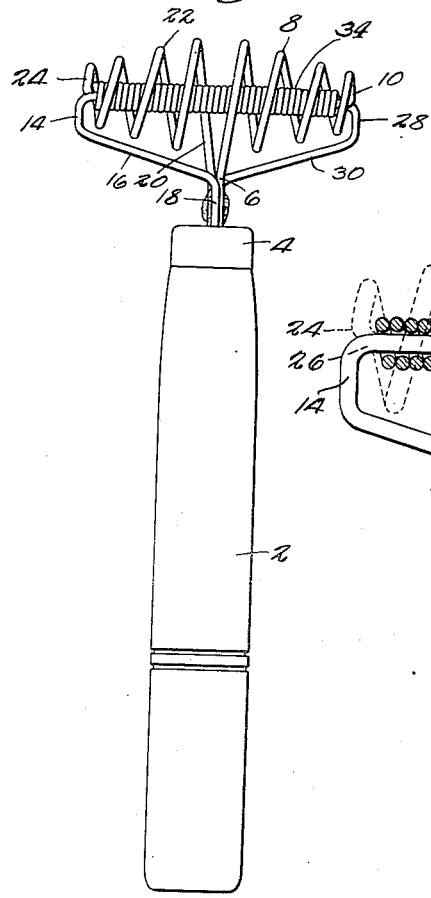
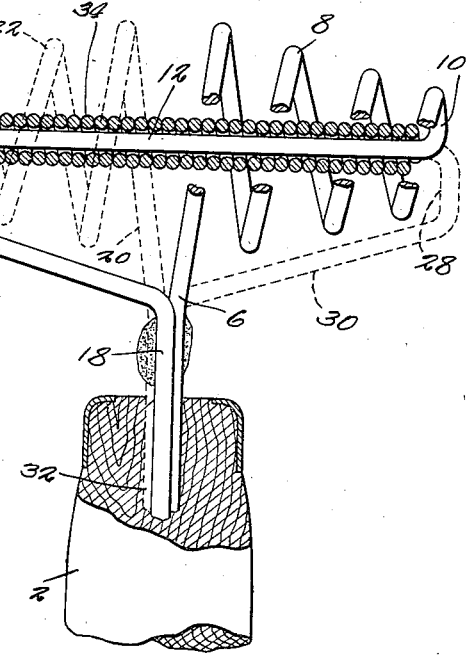
F. J. Pribil
INVENTOR.
BY Ch Knowles.
ATTORNEYS.

Patented May 25, 1948

2,442,326

UNITED STATES PATENT OFFICE 2,442,326

BEATER

Frank J. Pribil, St. Joseph, Mo.

Application June 11, 1946, Serial No. 675,905

2 Claims. (Cl. 259—144)

My present invention relates to an improved beater or whipper of the type adapted for kitchen use in beating or whipping foods. The beater of my invention is formed of fixed and stationary parts, and the beater is designed to be worked by hand in the food to be whipped and the construction of the whipper is such that the purpose for which it is designed will be accomplished with a minimum of time and effort.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a front elevational view of the beater of my invention.

Figure 2 is a partial vertical sectional view showing the conformation of the wire constituting the beater element.

Referring now to the drawings wherein like characters indicate like parts, I have illustrated the beater of my invention embodying a handle as 2 preferably of wood or other suitable substance, formed with a collar 4 preferably of metal.

The beater consists generally in a wire of suitable diameter and degree of stiffness which may be bent as desired and which will retain its bent shape having an end 6 in the handle 2 extending upwardly therefrom and formed with a helical coil 8 terminating in the bent end 10 from which the wire is fashioned into a center rod 12 substantially central of the coil 8. At the opposite end of the center rod 12 I have formed a bend 14 and a return portion 16 from which the end portion 18 depends and is secured in the handle 2. This wire bent as described constitutes one half of the beater.

The second half thereof is identical in shape but reversed in position and includes the end 20 in the handle 2 and extending upwardly therefrom and formed with the helical coil 22 the end 24 of which is bent to form the center bar 26 aligned with and lying close to the center bar or rod 12. The end 28 of the center bar 26 is bent as at 28 to form the return portion 30 from which depends the end 32 of the wire secured in the handle 2.

The center bars or rods 12 and 26 are secured in position by the coiled wire 34 along the length thereof, and the ends 6, 18, 20 and 32 of the two wire portions may be suitably secured together in or near the handle as by soldering or welding.

From the above description it will be apparent that the beater or whipper of my invention is sturdy and will retain its shape and perform its function over a long period of time. The novel and unique arrangement of the convolutions of the wires will result in the effective beating and/or whipping of the substance in which it is employed and the food substance will be whipped and beaten into a fluffy mass within a minimum of beating time.

Having thus fully described my invention what I claim as new and desire to secure by Letters Patent is:

1. A beater, comprising a handle, a pair of wires respectively formed intermediate their ends into helical coils arranged in longitudinal alignment, whereby to position the inner ends of the coils adjacent each other, said coils being disposed transversely relative to the handle, one end of each wire being extended from the inner end of the coil of said wire toward, and secured in, one end of the handle, said wires being each formed additionally with a straight portion constituting a center rod extending from the outer end of the coil of said wire, through both coils to the outer end of the opposed coil, and with a return portion extended from one end of the center rod toward, and secured in, said end of the handle, and means extending longitudinally of the center rods adapted to secure the center rods together.

2. A beater, comprising a handle, a pair of wires formed into longitudinally aligned helical coils, the convolutions of which are reduced toward the outer ends thereof, said coils being disposed transversely relative to the handle, the ends of the wires being secured in one end of the handle, each wire having a straight portion, constituting a center rod, adjacent one end and extended longitudinally through both coils, and means securing the center rods together.

FRANK J. PRIBIL.

REFERENCES CITED

The following references are of record in the file of this patent:

UNITED STATES PATENTS

| Number | Name | Date |
|---|---|---|
| 99,883 | Haines | Feb. 15, 1870 |
| 345,709 | Marsh | July 20, 1886 |
| 781,917 | Smith | Feb. 7, 1905 |
| 1,138,897 | Sari | May 11, 1915 |